United States Patent [19]

Barnabeo

[11] Patent Number: 4,551,504
[45] Date of Patent: Nov. 5, 1985

[54] WATER CURABLE, AZIDE SULFONYL SILANE MODIFIED ETHYLENE POLYMERS

[75] Inventor: Austin E. Barnabeo, Bridgewater, N.J.

[73] Assignee: Union Carbide Corporation, Danbury, Conn.

[21] Appl. No.: 570,784

[22] Filed: Jan. 18, 1984

[51] Int. Cl.$^4$ ............................................... C08F 8/34
[52] U.S. Cl. ................................. 525/333.9; 525/342
[58] Field of Search ............................. 525/333.9, 342

[56] References Cited

U.S. PATENT DOCUMENTS

| 3,585,103 | 6/1971 | Thomson . | |
|---|---|---|---|
| 3,646,155 | 2/1972 | Scott | 525/288 |
| 3,697,551 | 10/1972 | Thomson | 260/349 |
| 3,705,911 | 12/1972 | Thomson . | |
| 3,706,592 | 12/1972 | Thomson . | |
| 3,715,371 | 2/1973 | Thomson . | |
| 3,813,351 | 5/1974 | Thomson . | |
| 4,247,667 | 1/1981 | Nojiri | 525/254 |
| 4,291,136 | 9/1981 | Keogh | 525/102 |
| 4,328,323 | 5/1982 | Keogh | 525/106 |
| 4,412,042 | 10/1983 | Matsuura et al. | 525/260 |

FOREIGN PATENT DOCUMENTS

| 69245 | 6/1978 | Japan . |
| 93049 | 7/1979 | Japan . |
| 5913 | 1/1982 | Japan . |
| 1234034 | 6/1971 | United Kingdom . |
| 1264432 | 2/1972 | United Kingdom . |
| 1275120 | 5/1972 | United Kingdom . |
| 2101138 | 1/1983 | United Kingdom . |

*Primary Examiner*—Christopher A. Henderson
*Attorney, Agent, or Firm*—James C. Arvantes; R. C. Brown

[57] ABSTRACT

The disclosure is directed to water curable polymers of an azide sulfonyl silane and a substantially linear, low pressure ethylene polymer which are resistant to water and electrical treeing and can be used as coverings, such as insulation, about wires and cables.

12 Claims, No Drawings

WATER CURABLE, AZIDE SULFONYL SILANE MODIFIED ETHYLENE POLYMERS

SUMMARY OF THE INVENTION

The disclosure of this application is directed to water curable, azide sulfonyl silane modified ethylene polymers produced by reacting an ethylene polymer with an azide sulfonyl silane. The water curable, silane modified ethylene polymers of this invention are characterized by improved resistivity to water treeing and electrical treeing and consequently, are especially useful as insulation about wires and cables which are to carry heavy voltage loads and/or are to be exposed to a water environment.

BACKGROUND OF THE INVENTION

The introduction of olefin polymers as insulation about wires and cables was an important development in the wire and cable industry. Olefin polymers were found to be corrosion resistant, abrasion resistant and to afford protection to the wires and cables about which they were extruded. Although olefin polymers have properties which make them desirable for use as insulation material, they also have other properties which presented problems. For example, olefin polymers were found to degrade upon aging. Consequently, antioxidants were added to olefin polymers in order to extend their working lives.

A problem which is still of concern to the wire and cable industry, however, is the susceptibility of olefin polymers to water treeing and electrical treeing. Water trees occur in a polymer when the polymer is subjected to an electrical field over extended periods of time while in a water environment. Water trees are named as such because of the resemblance to branched trees. In actuality, however, water trees are fine passages or voids in the polymers which are visibly white when filled with water, but are invisible when dry. For purposes of observation, polymer samples having water trees must be boiled in water or dyed.

It is known that water trees grow in polymers from points in which there are voids or extraneous matter such as metal. This is particularly true in the case of an insulated electrical cable which is subjected to high voltages while in a water environment. Nevertheless, it is difficult to keep extraneous matter out of the polymeric insulation in order to prevent voids from occurring, in spite of continued efforts to improve production processes.

In contrast, electrical trees, which are simply called trees, are visibly black because they grow as a result of electrical discharges that carbonize the polymeric material, leaving carbon therein.

The problems of water trees and electrical trees have been generally approached from the standpoint of adding various additives to olefin polymers. This expedient, in many cases, has given rise to other problems due to the nature of the additives used.

DETAILED DESCRIPTION OF THE INVENTION

The present invention provides ethylene polymers which are unique in that they are water curable and resistant to water treeing and to electrical treeing without the aid of special additives. As a result, the ethylene polymers of the present invention are especially useful as insulation about wires and cables which are to carry heavy voltage loads and/or are to be exposed to a water environment.

The polymers of this invention are water curable, azide sulfonyl silane modified ethylene polymers produced by reacting a hydrolyzable azide sulfonyl silane with a substantially linear ethylene polymer having a density (ASTM D 1505) of about 0.850 to about 0.970, preferably about 0.890 to about 0.930.

Ethylene polymers, for purposes of this invention, are ethylene homopolymers and ethylene—$C_3$ to $C_8$ alpha olefin interpolymers. These interpolymers can be prepared by reacting a mixture containing about 50 to 99.9 mole percent, preferably about 75 to about 96 mole percent ethylene and from about 0.1 to about 50 mole percent and preferably about 4 to about 25 mole percent of one or more $C_3$ to $C_8$ alpha olefins such as propylene, butene-1, pentene-1, 4-methyl-pentene-1, hexene-1, heptene-1, octene-1 and the like, employing low pressures on the order of about 15 to 300 psi. A more detailed description of low pressure, substantially linear ethylene polymers is to be found in U.S. Pat. No. 4,011,382, granted Mar. 8, 1977.

Suitable hydrolyzable azide sulfonyl silanes and methods for the preparation thereof are described in U.S. Pat. No. 3,697,551, granted Oct. 10, 1972.

Illustrative hydrolyzable azide sulfonyl silanes fall within the scope of the following formula:

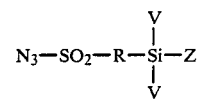

wherein R is a hydrocarbon radical, each V, which can be the same or different, is hydrogen, a hydrocarbon radical or a hydrolyzable group and Z is a hydrolyzable group.

Illustrative of suitable divalent hydrocarbon radicals for R are alkylene radicals having one to 18 carbon atoms inclusive, preferably one to 6 carbon atoms inclusive such as methylene, ethylene, propylene, butylene, hexylene and the like; aryl and cycloaliphatic radicals having 5 to 18 carbon atoms inclusive, preferably 6 to 8 carbon atoms inclusive such as cyclohexylene, phenylene, ethyl benzene and the like.

As stated, each V can be hydrogen, a hydrocarbon radical or a hydrolyzable group. Illustrative of such hydrocarbon radicals or hydrolyzable groups are alkyl radicals having one to 18 carbon atoms, inclusive, preferably one to 6 carbon atoms inclusive such as methyl, ethyl, n-propyl, n-butyl, n-hexyl and the like; alkoxy radicals having one to 18 carbon atoms inclusive, preferably one to 6 carbon atoms inclusive such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl, oxy phenyl and the like; cycloaliphatic radicals having 5 to 8 carbon atoms inclusive such as cyclopentyl, cyclohexyl, oxycyclohexyl and the like.

Z, as previously stated, is a hydrolyzable group among which can be noted alkoxy, oxy aryl and oxy cycloaliphatic radicals as previously described for V; halogens such as chlorine and the like and other hydrolyzable groups as further described in U.S. Pat. No. 3,408,420 to John B. Wiggill, granted Oct. 29, 1968.

Specific azide sulfonyl silanes include among others, 5-(trimethoxysilyl)amylsulfonyl azide, 4-(triethoxysilyl)cyclohexylsulfonyl azide, 2-methyl-4-(trichlorosilyl)butylsulfonyl azide, 6-(trimethoxysilyl)hexylsulfonyl azide, 2-(trichlorosilyl)ethylsulfonyl azide, 2-(triethoxysilyl)ethylsulfonyl azide, 3-(methyldimethoxysilyl)propylsulfonyl azide, 3-(trimethoxysilyl)propylsulfonyl azide, 4-(trimethoxysilyl)benzenesulfonyl azide, 2-(trimethoxysilyl)-ethylbenzenesulfonyl azide and the like.

The preparation of the silane modified copolymers of this invention is carried out by reacting an ethylene polymer with an azide sulfonyl halide at elevated temperatures. The temperatures can vary conveniently, from about 100° C. to about 250° C. and preferably from about 150° C. to about 190° C.

If desired, sources of energy, other than thermal energy can be used in order to carry out the reaction. These sources of energy include actinic light, radiation and the like.

The amount of azide sulfonyl silane used can vary from about 0.1 to about 4.0 and preferably from about 0.5 to about 2.0 percent by weight based on the weight of the ethylene polymer.

The reaction can be carried out at atmospheric, subatmospheric or superatmospheric pressure, although atmospheric pressure is preferred.

Also, in conducting the reaction between the azide sulfonyl silane and the ethylene polymer, it is customary to have present an antioxidant and free radical scavenger. Among suitable free radical scavengers can be noted mercaptobenzothiazole, sulfur, tetramethylthiuramdisulfide and the like. Antioxidants and free radical scavengers are used in amounts well known in the art.

Recovery of the silane modified ethylene polymer is effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder.

The reaction between the azide sulfonyl silane and the ethylene polymer can be depicted by the following equation:

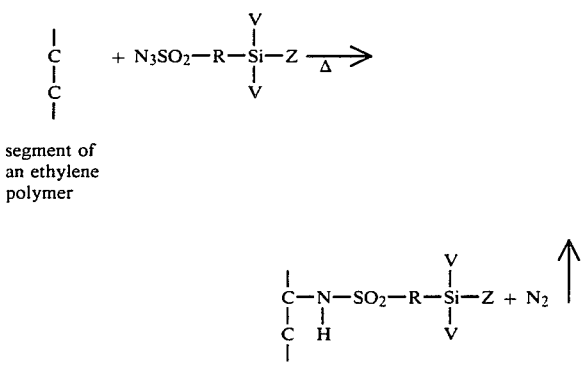

wherein the variables are as previously defined.

The curing or crosslinking of the silane modified ethylene polymer is effected by exposing the polymer to moisture. The moisture present in the atmosphere is usually sufficient to permit curing to occur over a period of 48 hours.

The rate of curing can be accelerated by exposure to an artificially humidified atmosphere or immersion in heated water or by exposure to steam.

Generally, curing is effected at temperatures on the order of about 23° C. to about 100° C., preferably about 70° C. to about 100° C.

Additionally, the crosslinking can be carried out in the presence of a silanol condensation catalyst.

A wide variety of materials which function as silanol condensation catalysts and which are known in the art can be employed in the crosslinking process. Such materials include metal carboxylates such as dibutyltin dilaurate; organic bases such as ethylamine, hexylamine, dibutylamine, piperidine and the like; and acids such as mineral acids and fatty acids and the like.

To the silane modified copolymers of this invention can be added various additives, in amounts well known in the art, such as fillers, among which can be mentioned carbon black, clay, talc (magnesium silicate), calcium carbonate, silica, alumina hydroxide and the like.

The silane modified copolymers can be rendered flame retardant by the addition thereto of halogen containing flame retardants such as decabromodiphenyl oxide, chlorinated polyethylene, polyvinyl chloride and halogenated paraffin waxes, alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosures of all patents noted are incorporated herein by reference.

In the following examples, which are illustrative of the present invention, the azide sulfonyl silane used was obtained from Hercules, Inc. as Product S-3076. This product has the formula:

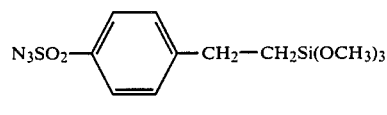

2-(trimethoxysilyl)ethylbenzenesulfonyl azide

EXAMPLE 1

Seventy-five grams of a substantially linear, low pressure ethylene-butene-1 copolymer having a melt index of 0.75 and a density of 0.92 and containing about 8 percent by weight combined butene-1 and 0.6 gram of 1,2-dihydro-2,3,4-trimethylquinoline were placed in a Brabender mixer which was set to operate at 50 rpm, at a temperature of 140° C., under an argon gas atmosphere and fluxed therein for 2 minutes. At the end of the 2 minute period, an additional 25 grams of ethylene-butene-1 copolymer, pretreated with azide sulfonyl silane, were added to the Brabender and mixing continued for another two minutes.

The 25 gram batch of the ethylene-butene-1 copolymer was pretreated by tumbling with 4.0 grams of a 50 percent by weight solution of azide sulfonyl silane in methylene chloride. Tumbling was carried out at room temperature for 5 minutes in a dried, glass jar. The methylene chloride was then removed by placing the jar in a vacuum oven, operating under a vacuum and at room temperature. The 25 gram batch of ethylene-butene-1 copolymer, containing 2 grams of the azide sulfonyl silane, was then added to the Brabender mixer. Using a methylene chloride solution of azide sulfonyl silane maintained the stability of the silane until it was actually used.

Contents of the Brabender mixer were heated to a temperature of 180° C. and maintained at this temperature, with mixing, for 20 minutes. At the end of the 20 minute period, dibutyltin dilaurate, in an amount of 0.03 gram, was added and mixing continued for another minute. The reaction product, an ethylene-butene-1 copolymer having grafted thereto a azide sulfonyl silane, contained repeating units of the following idealized formula:

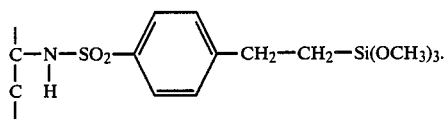

The reaction product was removed from the Brabender mixer and molded into plaques having dimensions of 3.5 inches by 3.5 inches by 0.075 inch (thickness). Plaques were molded in a press under the following conditions:

| Pressure | 200 psi | Followed | 5,000 psi |
|---|---|---|---|
| Temperature | 130° C. | By: | 130° C. |
| Time Cycle | 7 minutes | | 3 minutes |

Monsanto Rheometer determinations were made with respect to a plaque as prepared (Initial Reading) and with respect to a plaque which had been water cured by being placed in a water bath, which was at a temperature of 70° C. for 16 hours (Final Reading).

| Monsanto Rheometer | Initial Reading | Final Reading |
|---|---|---|
| Lb-Inch | 13 | 31 |

EXAMPLE 2

This example was conducted in a manner described in Example 1, using the same materials and amounts thereof with the exception that 99.64 grams of a substantially linear, low pressure ethylene-butene-1 copolymer, having a melt index of 5, a density of 0.908 and containing about 10 percent by weight butene-1, was used.

Plaques were prepared and tested in a manner described in Example 1.

| Monsanto Rheometer | Initial Reading | Final Reading |
|---|---|---|
| Lbs-Inch | 4 | 30 |

EXAMPLE 3

This example was conducted in a manner described in Example 1, using the same materials and amounts thereof with the exception that 0.18 gram of octadecyl-3-(3',5'-di-tert-butyl-4'-hydrophenyl)propionate and 0.18 gram of distearylthiopropionate were used in lieu of the 1,2-dihydro-2,3,4-trimethylquinoline.

Plaques were prepared and tested in a manner described in Example 1.

| Monsanto Rheometer | Initial Reading | Final Reading |
|---|---|---|
| Lbs-Inch | 12 | 28 |

The silane modified ethylene polymer of Example 3 was also tested for water treeing resistance and electrical treeing resistance and compared property wise to a Control, a silane modified polymer prepared as described in Example 1 with the exception that a high pressure, branched polyethylene having a melt index of 1.9 and a density of 0.922 was used in lieu of the low pressure polymer.

Plaques (from the "Control" composition) were prepared and tested in a manner described in Example 1.

| Monsanto Rheometer | Initial Reading | Final Reading |
|---|---|---|
| Lbs-Inch | 5 | 22 |

| ELECTRICAL TREE RESISTANCE-ANSI/ASTM D 3756-79 | | | | | |
|---|---|---|---|---|---|
| Voltage life (Hours) | | | | | |
| | at 23° C. | | at 50° C. | | at 70° C. |
| Voltage (kV) | Ex. 3 | Control | Ex. 3 | Control | Ex. 3 | Control |
| 15.0 | 52 | 6.5 | 102 | 46 | 63 | 37 |
| 17.5 | 54 | 17.2 | 53 | 30 | 34.2 | 11.8 |
| 20.0 | 34 | 20.0 | 39 | 21 | 17.8 | 21 |

The data show that the silane modified ethylene polymers of this invention have a relatively long voltage life and hence are more resistant to electrical treeing.

| PERCENT WATER TREE GROWTH RATE AFTER FIVE DAYS AT 5 kV | |
|---|---|
| Example 3 | 3 |
| Control | 23 |

Water tree growth rate of Example 3 was substantially lower than the water tree growth rate of the Control. A detailed description of this test appears in a Union Carbide Corporation publication entitled Kabelitem No. 152.

What is claimed is:

1. A water-curable polymer of a hydrolyzable, azide sulfonyl silane and a substantially linear, low pressure ethylene polymer having a density of about 0.850 to about 0.970 prepared by reacting a mixture of about 75 to about 96 mole percent ethylene and about 4 to about 25 mole percent butene-1, wherein the amount of said azide reacted with said ethylene polymer to produce said water-curable polymer is about 0.1 to about 4.0 percent by weight based on the weight of said ethylene polymer.

2. A water-curable polymer as defined in claim 1 wherein the amount of hydrolyzable, azide sulfonyl silane reacted with said ethylene polymer is about 0.5 to about 2.0 percent by weight.

3. A reactive composition comprising a hydrolyzable, azide sulfonyl silane in an amount of about 0.1 to about 4.0 percent by weight and an ethylene polymer as defined in claim 1.

4. A reactive composition as defined in claim 3 wherein said azide silane is present in an amount of about 0.5 to about 2.0 percent by weight.

5. A water curable polymer as defined in claim 1 wherein the substantially linear, low pressure ethylene polymer has a density of about 0.890 to about 0.930.

6. A water curable polymer as defined in claim 1 wherein the hydrolyzable azide sulfonyl silane has the formula:

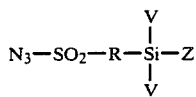

wherein R is a hydrocarbon radical, each V is hydrogen, a hydrocarbon radical or a hydrolyzable group and Z is a hydrolyzable group.

7. A water curable polymer as defined in claim 6 wherein R is ethyl benzene, each V and Z are alkoxy radicals.

8. A water curable polymer as defined in claim 7 wherein each V and Z are methoxy.

9. The crosslinked product of the polymer of claim 1.

10. A reactive composition as defined in claim 3 wherein the hydrolyzable azide sulfonyl silane has the formula:

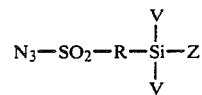

wherein R is a hydrocarbon radical, each V is hydrogen, a hydrocarbon radical or a hydrolyzable group and Z is a hydrolyzable group.

11. A reactive composition as defined in claim 10 wherein R is ethylbenzene, each V and Z are alkoxy radicals.

12. A reactive composition as defined in claim 11 wherein each V and Z are methoxy.

* * * * *

UNITED STATES PATENT AND TRADEMARK OFFICE
CERTIFICATE OF CORRECTION

PATENT NO. : 4,551,504

DATED : November 5, 1985

INVENTOR(S) : Austin E. Barnabeo

It is certified that error appears in the above-identified patent and that said Letters Patent is hereby corrected as shown below:

| | |
|---|---|
| Column 3, line 9 | "copolymers" should read -- polymers -- |
| Column 3, line 40 | "copolymer" should read -- polymer -- |
| Column 4, line 16 | "copolymers" should read -- polymers -- |
| Column 4, line 22 | "copolymers" should read -- polymers -- |
| Column 5, line 13 | "a" should read -- an -- |
| Column 5, line 39 | after "70°C" insert a comma -- , -- |
| Column 5, line 44 | "lb-inch" should read -- lbs-inch -- |

Signed and Sealed this

Eighteenth Day of March 1986

[SEAL]

Attest:

DONALD J. QUIGG

Attesting Officer

Commissioner of Patents and Trademarks